(12) United States Patent
Erskine et al.

(10) Patent No.: US 8,503,816 B2
(45) Date of Patent: Aug. 6, 2013

(54) METHODS FOR DETERMINING MIXEDNESS OF BATCH MATERIAL AND FOR OBTAINING SUBSTANTIALLY CONSISTENT MIXEDNESS OF BATCH MATERIAL

(75) Inventors: Kevin Michael Erskine, Corning, NY (US); Jacob George, Horseheads, NY (US); Amit Halder, Ithaca, NY (US); Daniel Edward McCauley, Watkins Glen, NY (US); Andrew Paul Schermerhorn, Painted Post, NY (US); Adama Tandia, Nelson, PA (US)

(73) Assignee: Corning Incorporated, Corning, NY (US)

( * ) Notice: Subject to any disclaimer, the term of this patent is extended or adjusted under 35 U.S.C. 154(b) by 192 days.

(21) Appl. No.: 13/087,845

(22) Filed: Apr. 15, 2011

(65) Prior Publication Data

US 2012/0264586 A1  Oct. 18, 2012

(51) Int. Cl.
*G06K 9/40* (2006.01)

(52) U.S. Cl.
USPC ........... 382/274; 382/260; 382/275; 382/278; 358/3.26; 358/3.27; 358/463

(58) Field of Classification Search
USPC ............... 382/274, 275, 278; 358/3.26, 3.27, 358/463
See application file for complete search history.

(56) References Cited

U.S. PATENT DOCUMENTS

| | | | |
|---|---|---|---|
| 5,098,870 A * | 3/1992 | Claar et al. | 501/96.3 |
| 5,340,655 A * | 8/1994 | Creber et al. | 428/446 |
| 5,388,772 A | 2/1995 | Tsau | |
| 5,579,415 A * | 11/1996 | Takano et al. | 382/282 |
| 5,628,945 A | 5/1997 | Riman et al. | |
| 5,881,167 A * | 3/1999 | Takano et al. | 382/169 |
| 5,918,977 A | 7/1999 | Borggaard et al. | |
| 5,946,088 A | 8/1999 | Aldridge | |
| 6,250,551 B1 * | 6/2001 | He et al. | 235/462.07 |
| 6,541,778 B1 * | 4/2003 | Jankowiak et al. | 250/461.1 |
| 6,604,223 B1 * | 8/2003 | Belser et al. | 714/812 |
| 6,690,016 B1 | 2/2004 | Watkins et al. | |
| 7,002,079 B2 * | 2/2006 | Mitchell et al. | 174/140 C |
| 7,162,089 B2 * | 1/2007 | Jin et al. | 382/199 |
| 7,336,358 B2 | 2/2008 | Ganz et al. | |
| 7,363,114 B2 | 4/2008 | Anderson et al. | |
| 7,363,115 B2 | 4/2008 | Anderson et al. | |
| 7,542,873 B2 | 6/2009 | Vince et al. | |
| 8,049,878 B2 * | 11/2011 | Zoeller, III | 356/237.6 |
| 2004/0165645 A1 | 8/2004 | Mathis | |
| 2004/0233431 A1 | 11/2004 | Ganz et al. | |
| 2005/0202571 A1 | 9/2005 | Mathis | |
| 2007/0043471 A1 | 2/2007 | Anderson et al. | |
| 2007/0043472 A1 | 2/2007 | Anderson et al. | |
| 2007/0043473 A1 | 2/2007 | Anderson et al. | |
| 2007/0106425 A1 | 5/2007 | Anderson et al. | |

OTHER PUBLICATIONS

Ferraris, Chiara F., Mixing Methods and Concrete Mixers: State of the Art, Journal of Research of the National Institute of Standards and Technology, Mar.-Apr. 2001, 391-399, vol. 106.

Kalyon, Dilhan M., et al., Electrical Properties of Composites as Affected by the Degree of Mixedness of the Conductive Filler in the Polymer Matrix, Polymer Engineering and Science, Jul. 2002, 1609-1617, vol. 42, No. 7.

* cited by examiner

*Primary Examiner* — Yosef Kassa
(74) *Attorney, Agent, or Firm* — Matthew B. McNutt

(57) ABSTRACT

The disclosure relates to methods for determining mixedness of batch material for making ceramic ware, and methods for obtaining substantially consistent mixedness of batch material for making ceramic ware.

16 Claims, 3 Drawing Sheets

METHODS FOR DETERMINING MIXEDNESS OF BATCH MATERIAL AND FOR OBTAINING SUBSTANTIALLY CONSISTENT MIXEDNESS OF BATCH MATERIAL

FIELD OF THE DISCLOSURE

The disclosure relates to methods for determining mixedness of batch material for making ceramic ware, and methods for obtaining substantially consistent mixedness of batch material for making ceramic ware.

BACKGROUND

Ceramic ware, including high surface area structures, may be used in a variety of applications. Such ware may be used, for example, as supports for catalysts for carrying out chemical reactions, or as sorbents/filters for the capture of particulate, liquid, or gaseous species from fluids such as gas streams and liquid streams. As an example, certain activated-carbon-containing ceramic ware, such as honeycombs, may be used in the severe conditions of exhaust gas environments, including, for example as catalytic converters and as diesel particulate filters. Among the many pollutants in the exhaust gases filtered in these applications are, for example, hydrocarbons and oxygen-containing compounds, the latter including, for example, nitrogen oxides (NOx) and carbon monoxide (CO), and carbon based soot and particulate matter.

Ceramic ware may be manufactured by mixing batch material and then further processing the batch material, such as forming an unprocessed or "green" body from the batch material and heat treating and/or firing the green body to make a ceramic. Providing substantially uniform ceramic ware with substantially uniform physical strength may be important to long term performance of the ware. Poor mixing of the batch material, however, may result in non-homogeneous distribution of various ingredients throughout the ceramic ware, which may cause defects in and/or varying properties throughout the ware.

The inventors have now discovered novel methods for determining mixedness of batch material for making ceramic ware, and methods for obtaining substantially consistent mixedness of batch material for making ceramic ware.

SUMMARY

In accordance with the detailed description and various exemplary embodiments described herein, the disclosure relates to methods for determining mixedness of batch material for making ceramic ware. The methods comprise, in various embodiments, obtaining at least one scanning electron microscope ("SEM") image of batch material; adjusting the grey-scale of the SEM image to reduce visibility of particles of elements and/or compounds comprising the batch material, but-for particles of at least one high atomic weight element; and applying an algorithm to an area of the grey-scale-adjusted SEM image to determine a homogeneity index value for the batch material. In various embodiments, the algorithm comprises computing a spatial distribution of the particles of the high atomic weight element, developing a corresponding random distribution, and calculating the homogeneity index value.

The disclosure also relates to methods for obtaining, during processing, substantially consistent mixedness of batch material for making ceramic ware. The methods comprise, in various embodiments, obtaining an SEM image of batch material; adjusting the grey-scale of the SEM image to reduce visibility of elements and/or compounds comprising the batch material, but-for particles of at least one high atomic weight element; applying an algorithm to an area of the grey-scale-adjusted SEM image to determine a homogeneity index value of the batch material; comparing the homogeneity index value of the batch material to a standard homogeneity value; and modifying at least one process parameter if the homogeneity index value is substantially less than the standard homogeneity value. In various embodiments, the algorithm comprises computing a spatial distribution of the particles of the high atomic weight element, developing a corresponding random distribution, and calculating the homogeneity index value.

BRIEF DESCRIPTION OF THE DRAWINGS

The accompanying drawings are included to provide a further understanding of the invention, and are incorporated in, and constitute a part of, the application. The drawings are not intended to be restrictive of the invention as claimed, but rather are provided to illustrate exemplary embodiments of the invention and, together with the description, serve to explain the principles of the invention.

DETAILED DESCRIPTION

Figure 1A:
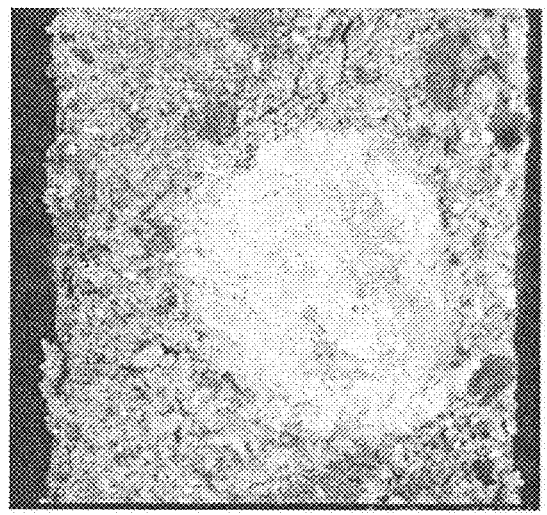
FIGS. 1A and 1B depict an SEM image of batch material and grey-scale-adjusted SEM image of batch material, respectively, representative of those obtained in accordance with various embodiments of the disclosed methods.

It is to be understood that both the foregoing general description and the following detailed description are exemplary and explanatory only, and are not restrictive of the invention, as claimed. Other embodiments will be apparent to those skilled in the art from consideration of the specification and practice of the embodiments disclosed herein. It is intended that the specification and examples be considered as exemplary only, with a true scope and spirit of the invention being indicated by the claims.

As used herein, the use of "the," "a," or "an" means "at least one," and should not be limited to "only one" unless explicitly indicated to the contrary. Thus, for example, the use of "the SEM image" or "a SEM image" is intended to mean "at least one SEM image."

The disclosure relates to methods for determining mixedness of batch material for making ceramic ware. As used herein, the term "mixedness," and variations thereof, is intended to refer to the degree of homogeneity of batch material after mixing.

As used herein, the term "batch material," "batch," and variations thereof are intended to mean a mixture comprising materials such as inorganic materials and, optionally, pore forming materials. The batch material of the present disclosure may be used to make, for example, ceramic ware, which is intended to include extruded ceramics and glass ceramics. Non-limiting examples of ceramic ware include those comprised of cordierite, aluminum titanate composites, mullite, alkali and alkaline-earth feldspar phases, and silicon carbide.

The methods of the disclosure comprise, in at least one embodiment, (1) obtaining at least one SEM image of a batch material;

(2) adjusting the grey-scale of the SEM image to reduce visibility of particles of elements and/or compounds comprising the batch material, but-for particles of at least one high atomic weight element; and (3) applying an algorithm to an area of the grey-scale-adjusted SEM image to determine a homogeneity index value for the batch material.

An SEM image of a batch material may be obtained using a scanning electron microscope, such as, by way of example only, a Phenom benchtop electron microscope marketed by Phenom-World.

In various embodiments of the disclosure, batch material may be removed from processing for analysis. In various embodiments, the batch material may be removed in its raw form, such as before melting or extruding, or after extrusion and/or drying.

For example, if the batch material is extruded, a thin cross-section of the extruded batch material may be cut from the extruded log, perpendicular to the cell direction. In at least one embodiment, the cross-section sample of batch material may be less than 0.4 inches thick, such as, for example, about 0.375 inches thick. A portion of the interior of the cross-section sample may then be removed, for example by drilling the sample parallel to the cell direction to remove a dice-like portion. In one exemplary embodiment, the dice-like portion of the sample may be about 0.5 inches in diameter.

In various embodiments, when the batch material is extruded, the surface of the batch material from which the SEM image will be collected may be polished to obtain a relatively smooth, flat surface. By way of example only, in at least one embodiment, the batch material sample may be polished using 600 grit SiC polishing paper.

It is within the ability of one of ordinary skill in the art to determine the appropriate magnification for collection of the SEM image. One skilled in the art may consider, among other things, the resolution of the image, brightness obtained for the components, and the size of the cells in the case of extruded batch material. In one exemplary embodiment, the SEM image may be collected at 500× magnification. In another exemplary embodiment, the SEM image may include an entire web of extruded batch material.

The methods may further comprise adjusting the grey-scale of the SEM image to reduce visibility of particles of elements and/or compounds comprising the batch material, but-for particles of a high atomic weight element. For example, in the SEM image, different elements and compounds are visible at different grey-scale levels, with high-atomic-weight elements, and compounds comprising the same, generally being the brightest. By adjusting the grey-scale, the brightness and contrast of the SEM image are changed such that only the high atomic weight element and/or compound comprising the same is made visible. In at least one exemplary embodiment, the grey-scale is adjusted to a cutoff value of 180 or greater, such as, for example, 200 or greater.

By way of example only, in aluminum titanate ceramic ware, the high atomic weight elements are lanthanum and strontium, present as $La_2O_3$ and $SrCO_3$, respectively. In at least one embodiment, the grey-scale of an SEM image of aluminum titanate batch material may be adjusted to reduce the visibility of all particles but-for those containing lanthanum and strontium.

Figure 1B:
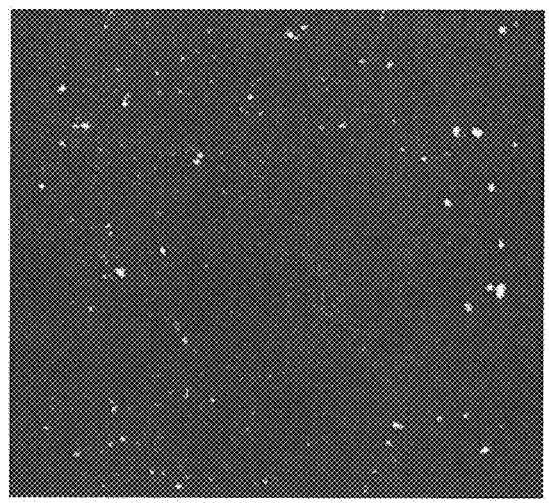

FIG. 1A depicts an exemplary SEM image of the wall of a poorly mixed extruded aluminum titanate-forming batch material in accordance with an exemplary embodiment of the disclosure. FIG. 1B depicts an image of FIG. 1A after it is grey-scale-adjusted in accordance with an exemplary embodiment of the disclosure. As seen in FIG. 1B, bright spots of high atomic weight particles comprising lanthanum and strontium are visible, and the visibility of other particles in the batch material is reduced.

The methods of the disclosure further comprise applying an algorithm to an area of a grey-scale-adjusted SEM image to determine a homogeneity index value for the batch material. As used herein, the term "homogeneity index value" is a quantification of the mixedness or homogeneity of the batch material.

It is within the ability of one skilled in the art to select the area of the SEM image for application of the algorithm.

In various exemplary embodiments, the algorithm applied to an area of the SEM image comprises (1) computing a spatial distribution of the particles of the high atomic weight element; (2) developing a corresponding random distribution; and (3) calculating the homogeneity index value.

The spatial distribution of the particles of the high atomic weight element may be determined by techniques known to those skilled in the art. In various embodiments, for example, the spatial distribution may be determined by a nearest-neighbor technique in which the center coordinates, circumferences, and areas of the high atomic weight particles are computed, and then the nearest-neighbor distance of each particle is computed and a corresponding nearest neighbor distribution is made. In one exemplary embodiment, if there are N particles, then N values of nearest-neighbor distances are obtained. The mean and standard deviation of the distribution are calculated.

The details of the mathematics of extracting the data and components identified above are not provided herein, as the determination of spatial distribution is generally known and is present in most statistical analysis packages, and it is within the ability of one skilled in the art to access and utilize such programs for the methods described herein.

For algorithms useful according to the disclosed methods, a corresponding random distribution with the same number of particles as in the analysis of the high atomic weight particles is also developed, and its mean and standard deviation is computed.

The algorithms useful according to the disclosed methods may then determine a homogeneity index value. In various embodiments, the homogeneity index value may be a comparison of the mean and standard deviations of the two distributions (one from the SEM image and one from the random distribution). In various embodiments, a mixedness index (h) may be calculated using the following $$h = \frac{12\sigma_R}{M_R + 6\sigma_R - M_o + 6\sigma_0}$$

wherein:

$M_o$ is the mean of the spatial distribution of the particles of the high atomic weight element;

$\sigma_o$ is the standard deviation of the spatial distribution of the particles of the high atomic weight element;

$M_R$ is the mean of the random distribution of the particles of the high atomic weight element; and $\sigma_R$ is the standard deviation of the random distribution of the particles of the high atomic weight element.

In at least one embodiment, the methods may further comprise determining an average homogeneity index value when at least two SEM images are obtained, and a homogeneity index value is determined for each of them.

The disclosure also relates to methods for obtaining, during processing, substantially consistent mixedness of batch material for making ceramic ware. As used herein, the term "substantially consistent mixedness," and variations thereof, is intended to mean that the mixedness of the batch material is considered by those of the art to be generally stable or within specified limits during processing. In at least one embodiment of the disclosed methods, substantially consistent mixedness is obtained when the homogeneity index value determined in accordance with the disclosed methods is substantially the same as, or higher than, a standard homogeneity value for the materials.

As set forth above, the methods comprise, in various embodiments, obtaining at least one SEM image of batch material; adjusting the grey-scale of the SEM image to reduce visibility of elements and/or compounds comprising the batch material, but-for particles of at least one high atomic weight element; and applying an algorithm to an area of the grey-scale-adjusted SEM image to determine a homogeneity index value of the batch material. As also set forth above, in various embodiments, the algorithm may comprise computing a spatial distribution of the particles of the high atomic weight element, developing a corresponding random distribution, and calculating the homogeneity index value.

The methods further comprise, in various embodiments, comparing the homogeneity index value of the batch material to a standard homogeneity value, and modifying at least one process parameter if the homogeneity index value is substantially less than the standard homogeneity value.

As used herein, the term "standard homogeneity value," and variations thereof, is intended to mean a value representative of the desired level of mixing or mixedness. For example, in various embodiments, the standard homogeneity value may be about 0.35 or greater, such as about 0.40 or greater, about 0.45 or greater, about 0.50 or greater, about 0.55 or greater, about 0.60 or great, about 0.65 or greater, or 0.70 or greater. The homogeneity index value of the batch material may be deemed substantially less than the standard homogeneity value if it differs from the standard value by about 0.01 or more, such as, for example, about 0.05 or more, about 0.10 or more, about 0.15 or more, or about 0.20 or more.

In accordance with various disclosed methods, a process parameter may be modified if the homogeneity index value is substantially less than the standard homogeneity value. As used herein, process parameters are intended to include any upstream process variable capable of influencing the mixedness of the batch material, such as, by way of example, raw material beneficiation (for example screening, blending, and milling of raw materials prior to mixing; and powder storage and transport conditions, including atmospheric conditions), rate and duration of blending raw materials, feed rate of the batch material to the extruder or melt; rotations per minute of an extruder, and water addition.

Figure 2:
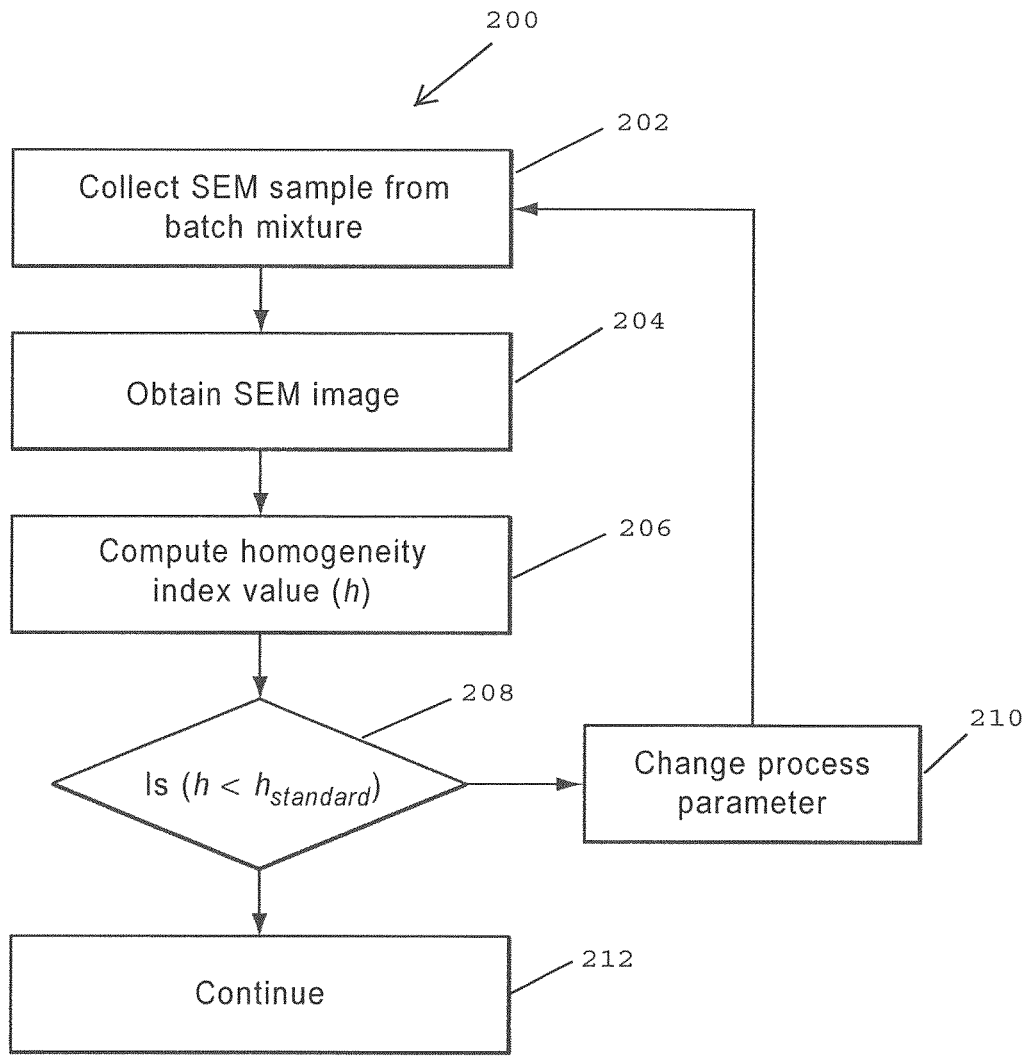
FIG. 2 is a flow chart representative of an exemplary embodiment of the methods disclosed herein.

FIG. 2 is a flow chart (200) representative of an exemplary embodiment of the methods disclosed herein as applied to extruded batch material. As depicted in the chart, first a sample is obtained from the extruded batch material (202), and then an SEM image is obtained (204). Next the homogeneity index value (h) is determined (206) using the SEM image with the grey-scale adjusted to reduce visibility of elements and/or compounds comprising the batch material, but-for particles of a high atomic weight element. Then the homogeneity index value (h) of the batch material is compared with a standard homogeneity index value (208). If the homogeneity index value (h) of the batch material is substantially less than the standard homogeneity index value, a process parameter is modified (210); otherwise, the process continues (212).

In various embodiments of the disclosure, the methods described herein may advantageously be performed during processing. For example, feedback of the mixedness or homogeneity information may be used for fine-tuning the process. In various embodiments, the methods may be completed in less than two hours, such as, for example, less than 1 hour or less than 45 minutes.

In various embodiments, obtaining substantially consistent mixedness of batch material may improve the homogeneity of the ceramic ware produced therefrom, and may thereby improve ultimate properties of the ceramic ware. For example, in some embodiments, the ceramic ware may have a lower likelihood of having very large pores (e.g., spanning the width of a web), which may cause failure of the ceramic ware in various applications. In other exemplary embodiments, such as where the ceramic ware may be used in filter products, homogeneous ceramic ware may have more uniform soot loading and a lesser likelihood of developing excessive thermal gradients during the regeneration process, which could reduce mechanical failures. In further exemplary embodiment, such as ceramic glasses, consistent mixedness of the batch material may reduce agglomerates in the ceramic ware produced.

The methods of the disclosure may, in various embodiments, help achieve stringent product specifications and/or may improve quality control of production, thereby reducing the risk of recalls and/or product waste. However, in various embodiments, such improvements may not be achieved.

The methods of the disclosure may also, in various embodiments, conserve energy and/or reduce costs by eliminating the expenditure of energy on mixedness beyond optimum values where there is no gain in batch material quality. However, in various embodiments, such improvements may not be achieved.

EXAMPLE

Two-hundred and seventy samples of extruded batch materials for forming aluminum titanate ceramic bodies we obtained and analyzed in accordance with the methods disclosed herein. Specifically, the samples were polished using 600 grit SiC polishing paper, and then SEM images were obtained at 500× magnification using a Phenom benchtop electron microscope. The grey-scale of the SEM images was adjusted to 200 to reduce visibility of elements and compounds comprising the batch material but for particles comprising lanthanum and particles comprising strontium.

Then homogeneity index values were determined for the samples by applying an algorithm to an area of each grey-scale adjusted SEM image. The algorithm comprised computing a spatial distribution of the particles of the at least one high atomic weight element using a nearest neighbor technique, developing a corresponding random distribution, and calculating the homogeneity index value using the equation:

$$h = \frac{12\sigma_R}{M_R + 6\sigma_R - M_o + 6\sigma_0}$$

Figure 3:
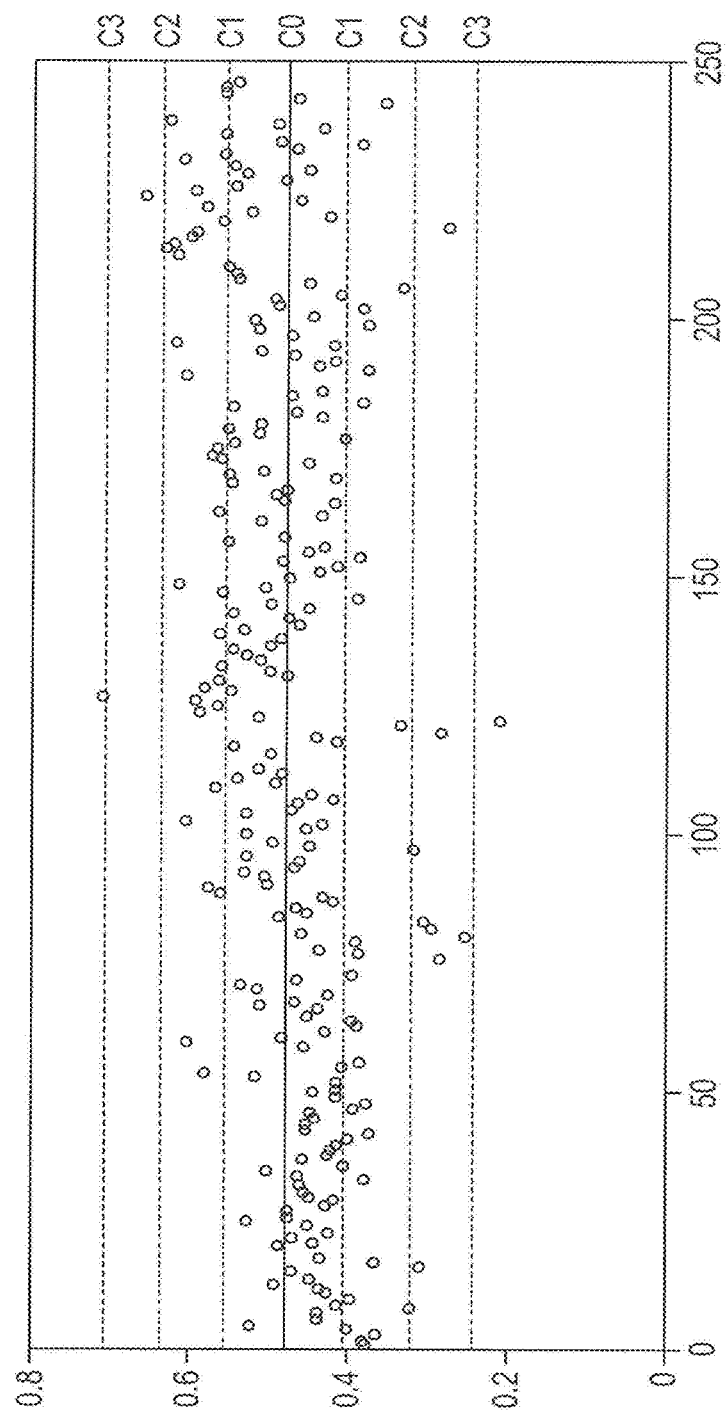
FIG. 3 is a plot of the homogeneity index values of batch materials in accordance with the Example set forth herein.

The resulting homogeneity index values are plotted in FIG. 3, with the sample number on the x-axis, and the homogeneity index value on the y-axis. The line at $C_0$ indicates the mean; $C_1$ is the mean±standard deviation; $C_2$ is mean±2× standard deviation; and $C_3$ is mean±3× standard deviation. As seen from FIG. 3, the majority of the values lay around 0.45, indicating that the process is relatively stable.

What is claimed is:

1. A method for determining mixedness of a batch material for making ceramic ware, said method comprising:
   (a) obtaining at least one SEM image of a batch material;
   (b) adjusting the grey-scale of the at least one SEM image to reduce visibility of particles comprising the batch material except for particles comprising at least one high atomic weight element, and to retain visibility of particles comprising at least one high atomic weight element; and
   (c) applying an algorithm to an area of the grey-scale-adjusted at least one SEM image to determine a homogeneity index value for the batch material;
   wherein the algorithm comprises computing a spatial distribution of the particles of the at least one high atomic weight element, developing a corresponding random distribution, and calculating the homogeneity index value.

2. The method of claim 1, wherein the homogeneity index value is calculated using the following formula:

$$h = \frac{12\sigma_R}{M_R + 6\sigma_R - M_o + 6\sigma_0}$$

wherein:
   $M_o$ is the mean of the spatial distribution of the particles of at least one high atomic weight element;
   $\sigma_o$ is the standard deviation of the spatial distribution of the particles of at least one high atomic weight element;
   $M_R$ is the mean of the random distribution of the particles of at least one high atomic weight element; and
   $\sigma_R$ is the standard deviation of the random distribution of the particles of at least one high atomic weight element.

3. The method of claim 1, wherein the spatial distribution of the particles of the at least one high atomic weight element is determined by a nearest neighbor technique.

4. The method of claim 1, wherein the batch material is an aluminum titanate ceramic-body-forming batch material.

5. The method of claim 1, wherein the particles of at least one high atomic weight element are chosen from particles comprising lanthanum and particles comprising strontium.

6. The method of claim 1, where in the particles of at least one high atomic weight element comprise particles of at least two high atomic weight elements.

7. A method for obtaining, during processing, substantially consistent mixedness of a batch material for making ceramic ware, said method comprising:
   (a) obtaining an SEM image of batch material;
   (b) adjusting the grey-scale of the SEM image to reduce visibility of particles comprising the batch material except for particles comprising at least one high atomic weight element, and to retain visibility of particles comprising at least one high atomic weight element;
   (c) applying an algorithm to an area of the grey-scale-adjusted SEM image to determine a homogeneity index value of the batch material;
   (d) comparing the homogeneity index value of the batch material to a standard homogeneity value; and
   (e) modifying at least one process parameter if the homogeneity index value is substantially less than the standard homogeneity value,
   wherein the algorithm comprises computing a spatial distribution of the particles of the at least one high atomic weight element, developing a corresponding random distribution, and calculating the homogeneity index value.

8. The method of claim 7, wherein the homogeneity index value is calculated using the following formula:

$$h = \frac{12\sigma_R}{M_R + 6\sigma_R - M_o + 6\sigma_0}$$

$M_o$ is the mean of the spatial distribution of the particles of at least one high atomic weight element;
$\sigma_o$ is the standard deviation of the spatial distribution of the particles of at least one high atomic weight element;
$M_R$ is the mean of the random distribution of the particles of at least one high atomic weight element; and
$\sigma_R$ is the standard deviation of the random distribution of the particles of at least one high atomic weight element.

9. The method of claim 7, wherein the spatial distribution of the particles of the at least one high atomic weight element is determined by a nearest neighbor technique.

10. The method of claim 7, wherein the batch material is a ceramic-body-forming batch material.

11. The method of claim 7, wherein the batch material is an aluminum titanate ceramic-body-forming batch material.

12. The method of claim 7, wherein the particles of at least one high atomic weight element comprise particles of at least two high atomic weight elements.

13. The method of claim 7, wherein the at least one process parameter is chosen from batch material feed rate, extruder rotations per minute, and raw material benefication.

14. A method for determining mixedness of an aluminum-titanate ceramic body-forming batch material, said method comprising:
   (d) obtaining at least one SEM image of a batch material;
   (e) adjusting the grey-scale of the at least one SEM image to reduce visibility of particles comprising the batch material except for particles comprising lanthanum or strontium, and to retain visibility of particles comprising lanthanum or particles comprising strontium; and
   (f) applying an algorithm to an area of the grey-scale-adjusted at least one SEM image to determine a homogeneity index value for the batch material;
   wherein the algorithm comprises computing a spatial distribution of the particles comprising lanthanum and particles comprising strontium, developing a corresponding random distribution, and calculating the homogeneity index value.

15. The method of claim 14, wherein the homogeneity index value is calculated using the following formula:

$$h = \frac{12\sigma_R}{M_R + 6\sigma_R - M_o + 6\sigma_0}$$

wherein:
   $M_o$ is the mean of the spatial distribution of the particles of at least one high atomic weight element;
   $\sigma_o$ is the standard deviation of the spatial distribution of the particles of at least one high atomic weight element;
   $M_R$ is the mean of the random distribution of the particles of at least one high atomic weight element; and
   $\sigma_R$ is the standard deviation of the random distribution of the particles of at least one high atomic weight element.

16. The method of claim 14, wherein the spatial distribution of the particles of the at least one high atomic weight element is determined by a nearest neighbor technique.

* * * * *